United States Patent [19]

Meyers et al.

[11] Patent Number: 4,823,596

[45] Date of Patent: Apr. 25, 1989

[54] MANUAL TRANSMISSION SHIFT EVALUATION DEVICE

[75] Inventors: Richard S. Meyers; George A. Willford, both of Toledo, Ohio

[73] Assignee: Dana Corporation, Toledo, Ohio

[21] Appl. No.: 933,790

[22] Filed: Nov. 24, 1986

[51] Int. Cl.[4] ............................................. G01M 13/02
[52] U.S. Cl. ................................................... 73/118.1
[58] Field of Search ............................... 73/118.1, 162

[56] References Cited

U.S. PATENT DOCUMENTS

| | | | |
|---|---|---|---|
| 3,326,036 | 6/1967 | Hoeppner | 73/118.1 |
| 3,482,441 | 12/1969 | Goetchius et al. | 73/118.1 |
| 3,516,290 | 6/1970 | Matteucci | 73/162 |
| 3,530,712 | 9/1970 | Matteucci | 73/162 |
| 3,756,358 | 9/1973 | Espenschied et al. | 192/0.09 |
| 3,967,495 | 7/1976 | Wesner et al. | 73/118.1 |
| 4,324,322 | 4/1982 | Sibeud | 192/0.032 |
| 4,361,060 | 11/1982 | Smyth | 74/866 |
| 4,366,889 | 1/1983 | Wang | 192/0.092 |
| 4,391,131 | 7/1983 | Scourtes | 73/118.1 |

FOREIGN PATENT DOCUMENTS

| | | | |
|---|---|---|---|
| 0033406 | 3/1979 | Japan | 73/118.1 |
| 48311 | 11/1983 | Japan | 73/162 |
| 0048631 | 3/1984 | Japan | 73/162 |

Primary Examiner—Stewart J. Levy
Assistant Examiner—Robert R. Raevis
Attorney, Agent, or Firm—MacMillan, Sobanski & Todd

[57] ABSTRACT

A method of testing a manual transmission utilizes a test fixture adapted to be positioned on the transmission shift tower mounting pad. The test fixture includes a plurality of cylinders equal in number to the number of transmission shift rails, with each cylinder being connected to a separate actuating arm operatively engaging a separate one of the shift rails. The transmission is positioned in a test stand for supplying power to the transmission input while simultaneously loading the output, and providing an oil flush. The cylinders are then actuated in a predetermined sequence to independently actuate the shift rails and shift the transmission in a predetermined sequence. In accordance with the present invention, a constant force is applied to the shift rail to effect a shift, and the time required to complete a particular shift is measured. This measured time is then compared to a predetermined reference time, which represents the time period the shift should have taken in a satisfactory transmission. If a particular measured time varies significantly from a corresponding reference time, this may indicate that certain components of the transmission are defective or have been improperly assembled.

17 Claims, 10 Drawing Sheets

MANUAL TRANSMISSION SHIFT EVALUATION DEVICE

BACKGROUND OF THE INVENTION

The present application relates generally to an apparatus and method for testing a manual transmission. In particular, the present invention provides an apparatus and method for evaluating the shifting characteristics of a manual transmission. The present invention can be used for either prototype or production-line testing.

Due to the complexity of automatic transmissions and the possibility that a defective component has been used or an assembly error has occurred, automatic transmissions are typically tested either during or subsequent to the production process. Such testing can eliminate the need for removing and replacing a defective transmission after it has been installed in a vehicle, which can be an inconvenient and time-consuming task. Testing devices appropriate for this purpose are disclosed in U.S. Pat. No. 4,391,131 issued to Scourtes and entitled Transmission Testing Apparatus and Method, and in U.S. Pat. No. 4,520,659 issued to Lucia et al. and entitled Transmission Tester.

However, the testing of manual transmissions has historically not been done with such testing devices. Typically, such testing has been done by a human operator who positions an assembled transmission which is to be tested in a test stand for supplying power to the transmission input while simultaneously loading the output. The operator then manually shifts the transmission through the various gear ranges, while subjectively evaluating the transmission based on shift feel and sound.

SUMMARY OF THE INVENTION

The present invention provides a method of testing a manual transmission by providing a test fixture adapted to be positioned on the transmission shift tower mounting pad. The test fixture includes a plurality of cylinders equal in number to the number of transmission shift rails, with each cylinder being connected to a separate actuating arm operatively engaging a separate one of the shift rails. The cylinders are then actuated in a predetermined sequence to independently actuate the shift rails and shift the transmission in a predetermined sequence. In accordance with the present invention, a constant force is applied to the shift rail to effect a shift, and the time required to complete a particular shift is measured. This measured time is then compared to a predetermined reference time, which represents the time period the shift should have taken in a satisfactory transmission. If a particular measured time varies significantly from a corresponding reference time, this may indicate that certain components of the transmission are defective or have been improperly assembled.

The present invention offers several advantages over prior methods of testing manual transmissions. With the method and apparatus of the present invention, the evaluation of the transmission is both consistent and accurate, since human error and human differences of opinion are eliminated. Also, in addition to evaluating the shift quality of the transmission, the present invention may uncover other manufacturing defects. The invention can be used to test a prototype transmission, or it can be used on a production line. And, since the test fixture utilizes one actuating hydraulic or pneumatic cylinder per transmission shift rail, complex linkages which would otherwise be necessary to mechanically simulate the motion of a driver in shifting the transmission through its operating ranges are avoided.

The above, as well as other advantages and features of the present invention, will become readily apparent to one skilled in the art from reading the following detailed description of the preferred embodiments of the invention in conjunction with the attached drawings.

DETAILED DESCRIPTION OF THE PREFERRED EMBODIMENTS

Figures 1, 2:
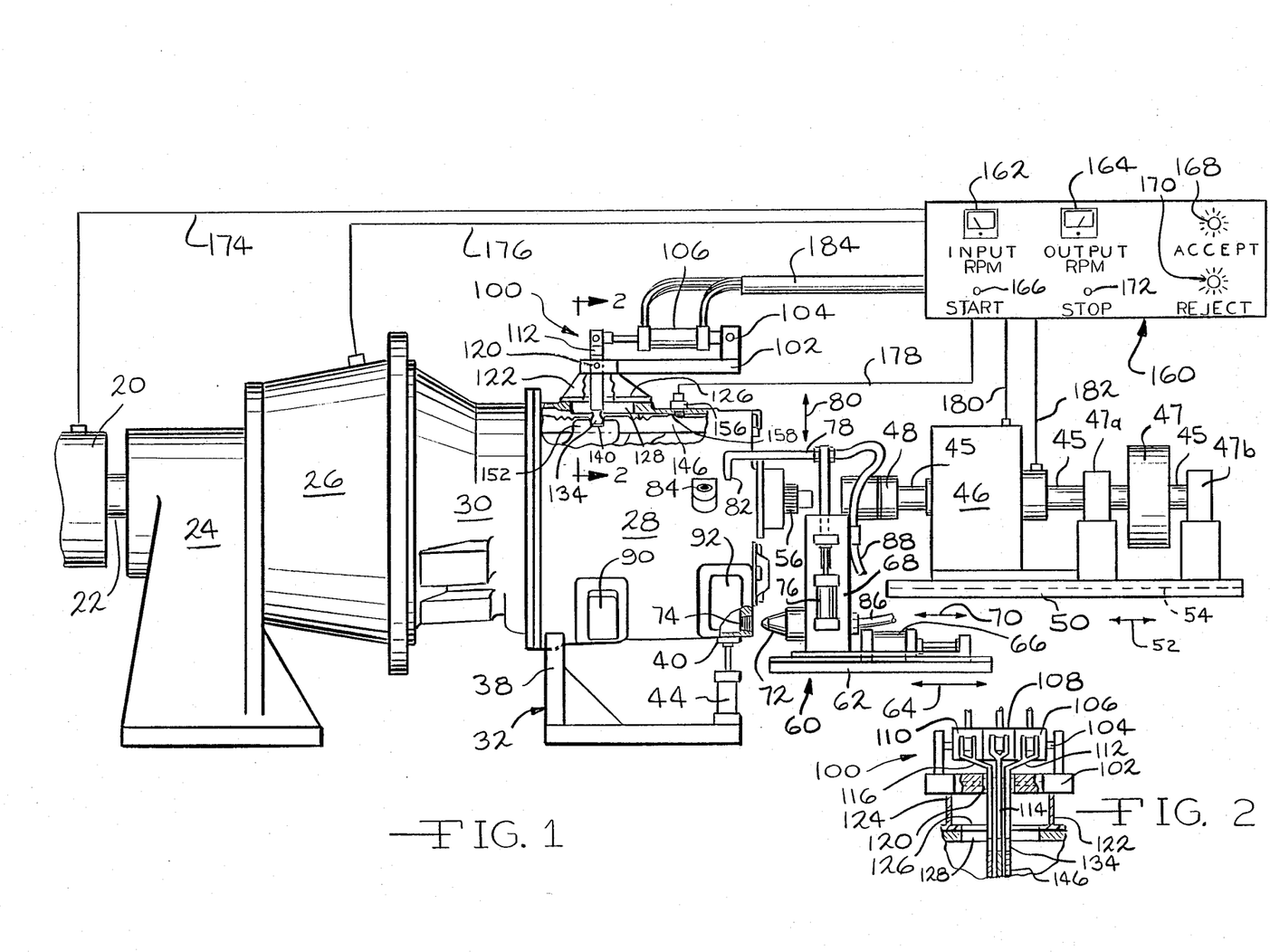
FIG. 1 is a schematic illustration of a manual transmission in a production-line automatic test stand according to the invention, provided with a manually-mounted shifting test fixture according to the invention.
FIG. 2 is a sectional view taken along line 2—2 in FIG. 1 and shows the use of three separate actuating cylinders and associated actuating arms for independently operating three shift rails.

Turning first to FIG. 1, there is shown the general configuration of a test stand on which a manual transmission to be tested is mounted. The test stand can be used to test either a prototype transmission, or can be used on a production line for testing production transmissions. A motor, preferably an electric motor 20, has an output shaft 22 which passes through a fixed pedestal 24 and into a test clutch housing 26, where it is attached to a conventional clutch (not shown).

The clutch is provided with an extension member (not shown) adapted to be connected to an input shaft (not shown) of a transmission 28 under test. The input shaft of the transmission 28 extends into a transmission clutch housing 30. In a typical vehicle installation, the transmission input shaft would be connected to a clutch located within the clutch housing 30. Thus, the clutch in the test clutch housing 26 is provided with the extension member (not shown) to bridge this extra distance. This extension member is preferably provided with a splined bore for receiving a splined end of the transmission input shaft. While the clutch housing 30 could be uninstalled at this stage of production, testing the transmission 28 with the clutch housing 30 installed enables fabrication errors in the parallelism of the mounting surfaces of the clutch housing 30 to be detected, since misalignment would generally result in detectable vibration and noise.

The transmission 28 is brought into position resting at a predetermined height on a movable jack means 32, which is adapted to initially move the transmission 28 having the clutch housing 30 attached thereto into axial alignment with the test clutch housing 26. Next, the transmission is moved in an axial direction toward the housing 26 to engage the transmission input shaft with the extension member (not shown). When positioned on the jack means 32, the transmission 28 rests both on a front fixed bridge member 38, and upon a vertically moveable rear bridge member 40 connected to a hydraulic cylinder 44. As will appear in greater detail below, the hydraulic cylinder 44 is provided for tilting the transmission slightly downwardly at the end of the test procedure to drain oil therefrom. Also, as will be apparent, the jack means 32 may be in the nature of a conventional transmission jack, with the bridge members 38 and 40 both being independently movable.

After the transmission 28 has been moved into the position illustrated in FIG. 1, a load absorber 46 coupled to a shaft 45 is connected. The load absorber 46 may be a shear coupling, a paddle-wheel in water or oil, a direct-current generator, an eddy current brake, or any other similar device. Such devices differ in the method of disposing of generated heat and in whether their adjustment is performed by changing an electrical quantity or moving a mechanical element, both of which are functions that may be performed with automated equipment.

In the preferred embodiment, the load absorber 46 is a water brake, set to provide a predetermined load torque such as 250 foot-pounds. Also, a flywheel 47 is mounted on the shaft 45 and is provided with a significant amount of rotating mass to simulate the inertia of a vehicle. Spaced apart bearing members 47a and 47b support the shaft 45 on opposite sides of the flywheel 47. An internally splined adapter 48 is mounted on one end of the shaft 45. The load absorber 46 and the flywheel 47 are mounted on a carriage 50 for movement in a direction indicated by the arrows 52 along rails (not shown) which cooperate with grooves identified by the dashed line 54. A hydraulic cylinder (not shown) may be used to move the carriage 50 in the direction of the arrows 52 to move the adapter 48 into engagement with an externally splined output shaft 56 of the transmission 28. The load absorber 46 can be provided with a tachometer if desired.

Either after the load absorber 46 has been moved into engagement with the transmission output shaft 56, or while it is being moved, an oil flush mechanism 60 is moved into position. The oil flush mechanism 60 may include a carriage 62 mounted to move in the direction of the arrows 64 upon rails (not shown) under the control of a hydraulic cylinder (not shown). The carriage 62 includes a hydraulic cylinder 66 for moving a vertical support member 68 in a horizontal direction indicated by the arrows 70 so that a rubber conical apertured member 72 moves into engagement with an oil drain opening 74 at the bottom rear of the transmission 28. With the vertical support member 68 in this position, a second hydraulic cylinder 76 mounted upon the vertical support member 68 is actuated, causing it to move an oil fill nozzle member 78 in the direction indicated by the arrow 80. This places the tip portion 82 of the nozzle member 78 in an oil fill aperture 84 located in the side wall of the transmission 28. Thereafter, oil may be temporarily provided to the transmission 28 for the purpose of testing and of flushing out any undesired loose material.

Preferably, the oil used for testing and flushing is a very light oil, such as the type of oil used with automatic transmissions. The oil flush mechanism 60 can be set to provide a predetermined amount of oil to the transmission for testing purposes. Alternatively, the nozzle member 78 can be a double tube arrangement in which one tube continuously supplies oil and a second tube functions as a return line to maintain the oil at a predetermined level.

It will be appreciated that the oil flush mechanism 60 can readily be modified to accommodate different types of transmissions having fill and drain apertures in different locations than those illustrated in FIG. 1.

Several characteristic terms have been used to describe the shifting of a manual transmission. Shifting may be described as smooth or rough, fast or slow, easy or difficult, and the like. The present invention proposes the use of a constant force applied to the shifting mechanism throughout the entire shift with the time required to complete a shift used as an indication of the desirability of shift characteristics. It is believed that this evaluates, in one convenient step, the frictional characteristics and alignment of synchronizers, the ease with which moveable elements move upon shafts, the existence of binding or cocking in the assembly of gears on shafts, shifter forks on shifter rings, or shift rails in shift rail brackets. In addition, observable vibration or the measurement of transmission noise (which also may/be automated) provides an indicia of gear irregularities or eccentricities.

The time required for shifting may be measured in numerous ways. The time could be measured with information provided by tachometers or, for example, a timer could be started by the signal to the solenoid valve that actuates a cylinder, and stopped when a frequency analyzer detected the characteristic frequency of two selected gears rotating in unison. In the present invention, for simplicity and dependability, the mechanical position of the hydraulic cylinders are sensed, utilizing proximity detectors, three for each cylinder. These proximity detectors may be of the inductive type, the capacitive type, or the optical type. The capacitive type is preferred because of its relative immunity to contamination by magnetic materials and oil vapors.

In the interest of simplicity, these timing devices are not illustrated in a shifting test fixture 100 shown in FIG. 1. The shifting test fixture 100 includes an upper support plate 102 having an upwardly extending bracket at the rear end thereof for defining a pivot point 104. One of the end of a plurality of hydraulic cylinders 106, 108, and 110 (shown in FIG. 2) are pivotally connected to the pivot point 104. Each of these hydraulic cylinders has its associated cylinder rod pivotally connected to an upper end of one of a plurality of actuating arms 112, 114, and 116 all of which have respective intermediate pivot points at the front end of the upper support plate 102 defined by the pivot 120. The upper support plate 102 is supported above the transmission 28 by means of a pair of spaced apart vertical bracket members 122 and 124 and a lower mounting plate 126. The mounting plate 126 fits on the shift tower mounting pad portion 128 of the transmission 28, and may be provided with locating pins (not shown) to engage existing apertures on the shift tower mounting portion 128 for properly locating the test fixture 100 relative to the transmission 28.

The actuating arms 112, 114, and 116 have lower end portions such as end portion 134 of the arm 112 (shown in FIG. 1) which are received in upwardly facing respective notch portions such as notch 140 provided in respective transmission shift rails such as rail 146. In FIG. 1, a shift fork 152 is shown connected to the shift rail 146.

The transmission 28 also includes a reverse or backup switch 156 which is operated by contact with a projection 158 on the shift rail 146, and is appropriately set for proper actuation.

The hydraulic cylinders 106, 108, and 110 may be designed for operation by either air pressure or oil pressure, whichever is desired, and may be either two-position cylinders which are stopped in an intermediate position in response to a position sensor, with the transmission neutral shift position being insured by the normal transmission rail detent mechanisms within the transmission. Typically, the hydraulic cylinders are provided with internal means for adjusting the stroke length of the associated cylinder rod. Preferably, the hydraulic cylinders are conventional three-position cylinders.

As illustrated in FIG. 1, all necessary control equipment is housed in a control cabinet 160, which is shown provided with an input shaft tachometer 162, an output shaft tachometer 164 responsive to the tachometer 58, a start button 166, and a pair of indicator lights 168 and 170. The indicator light 168 is used to indicate an acceptable transmission and the indicator light 170 is used to indicate that the transmission should be rejected. Such other indicators or controls as are desired may also be supplied. One such customary control is an emergency stop button 172.

As illustrated, the control cabinet 160 is connected to the electric motor 20 through a line 174 which may carry both a speed selection signal and a speed feedback signal which may be used to actuate the tachometer 162. A line 176 interconnects the control cabinet 160 and the clutch within the test clutch housing 26. The line 176 may carry a hydraulic signal to operate the test clutch through a hydraulic cylinder, or may contain an electric signal either for operating the clutch with a solenoid or for operating a solenoid valve connected to a hydraulic actuating cylinder. A line 178 connects the backup switch 156 and the control cabinet 160. This line is manually put in place before starting the test.

A line 180 interconnects the control cabinet 160 and the load absorber 46 and carries an appropriate electrical or hydraulic signal to engage, disengage, or adjust the load applied by the load absorber 46, depending on the type of absorber provided. In the preferred embodiment of the invention a paddle-wheel-in-water load absorber is used. And, a line 182 interconnects the tachometer 58 and the control cabinet 160. A hydraulic line conduit 184 carries a plurality of fluid lines, which as before, may carry either air under pressure or hydraulic fluid under pressure to the hydraulic cylinders 106, 108, and 110. The hydraulic lines may number between six and twelve depending on whether two or three position cylinders are used, and whether independent control of the two sections of a three-position cylinder is desired.

Turning now to FIGS. 3, 4, 5, and 5a there is shown a shifting test mechanism 190 which can be substituted for the test fixture 100 shown in FIG. 1, and which is automatically placed in position on a mounting pad of a transmission to be tested. Thus, the test mechanism 190 is especially suited for testing transmissions after assembly on a production line. The shifting test mechanism 190 includes a vertically extending support member 192. The support member 192 has a lower end (not shown) fixed in a selected position with respect to the fixed pedestal 24 of the transmission test stand to allow a movable portion 200 of the the shifting test mechanism 190 to be moved downwardly into proper engagement with the mounting pad of the transmission 28. The shifting test mechanism 190 includes an upwardly extending mounting plate 194 having a lower end secured to the support member 192 and upon which a hydraulic cylinder 196 is mounted by bolts 198. The cylinder 196 is used to move the moving portion 200 of the shifting test fixture 190 in a vertical direction indicated by arrow 202. The moving portion 200 includes a pair of spaced apart upper guide blocks 208 and a pair of spaced apart lower guide blocks 210 slidable along a pair of spaced apart, vertically extending guide shafts 204 (only one of the blocks 208, the blocks 210, and the shafts 204 are visible in FIG. 3). The guide shafts 204 run between an upper support block 212 and a lower support block 214 which are secured to the mounting plate 194. The hydraulic cylinder 196 includes a shaft 215 having a lower end connected to a bridging member (not shown) connected between the upper guide blocks 208.

Figures 3, 4:
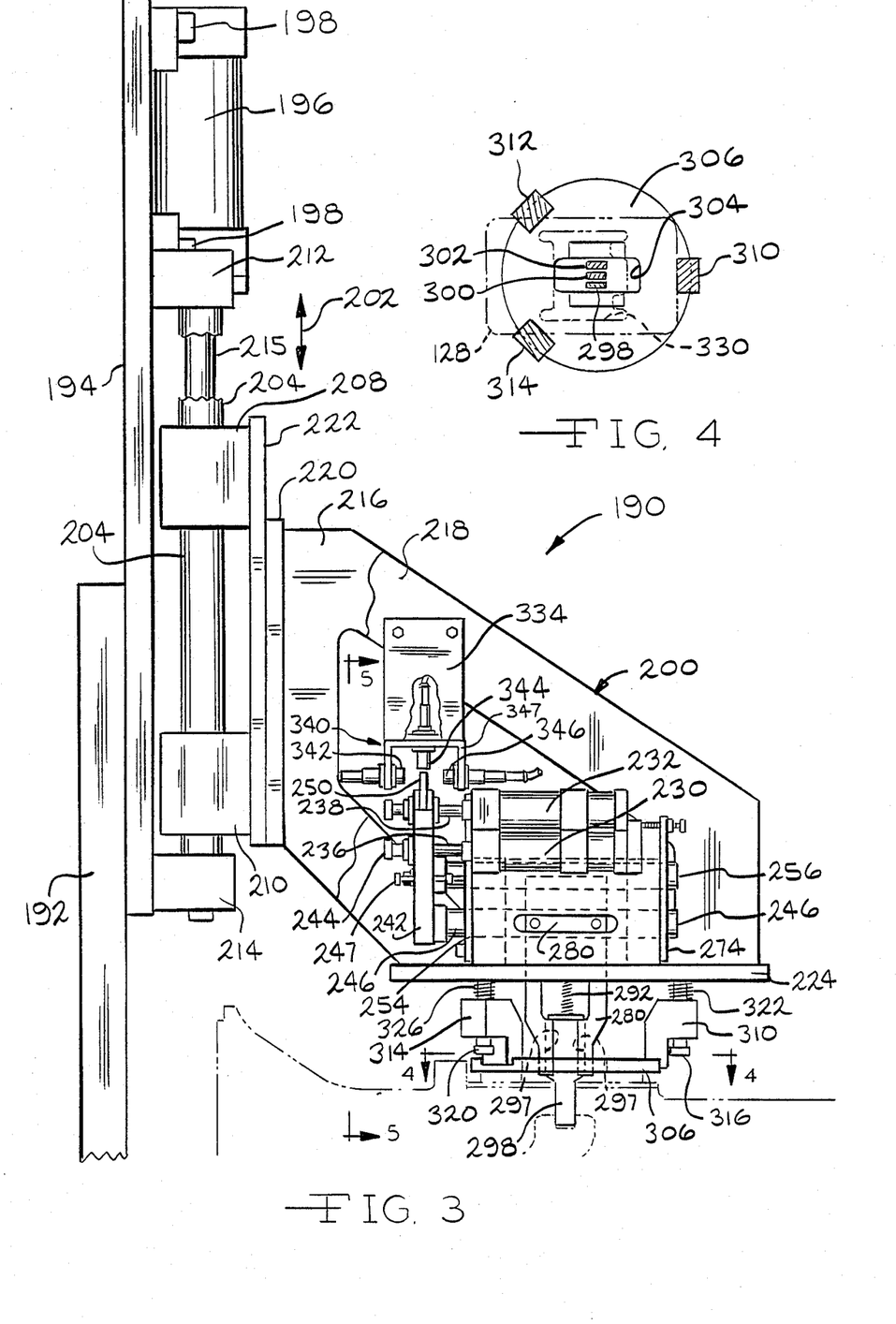
FIG. 3 illustrates an alternate embodiment of a transmission shift test fixture which is automatically positioned in proper test position on a transmission, and is especially suited for production line testing.
FIG. 4 is a view taken along line 4—4 in FIG. 3 and illustrating the portion of the test fixture for engagement with the transmission mounting pad area.
Figure 5:
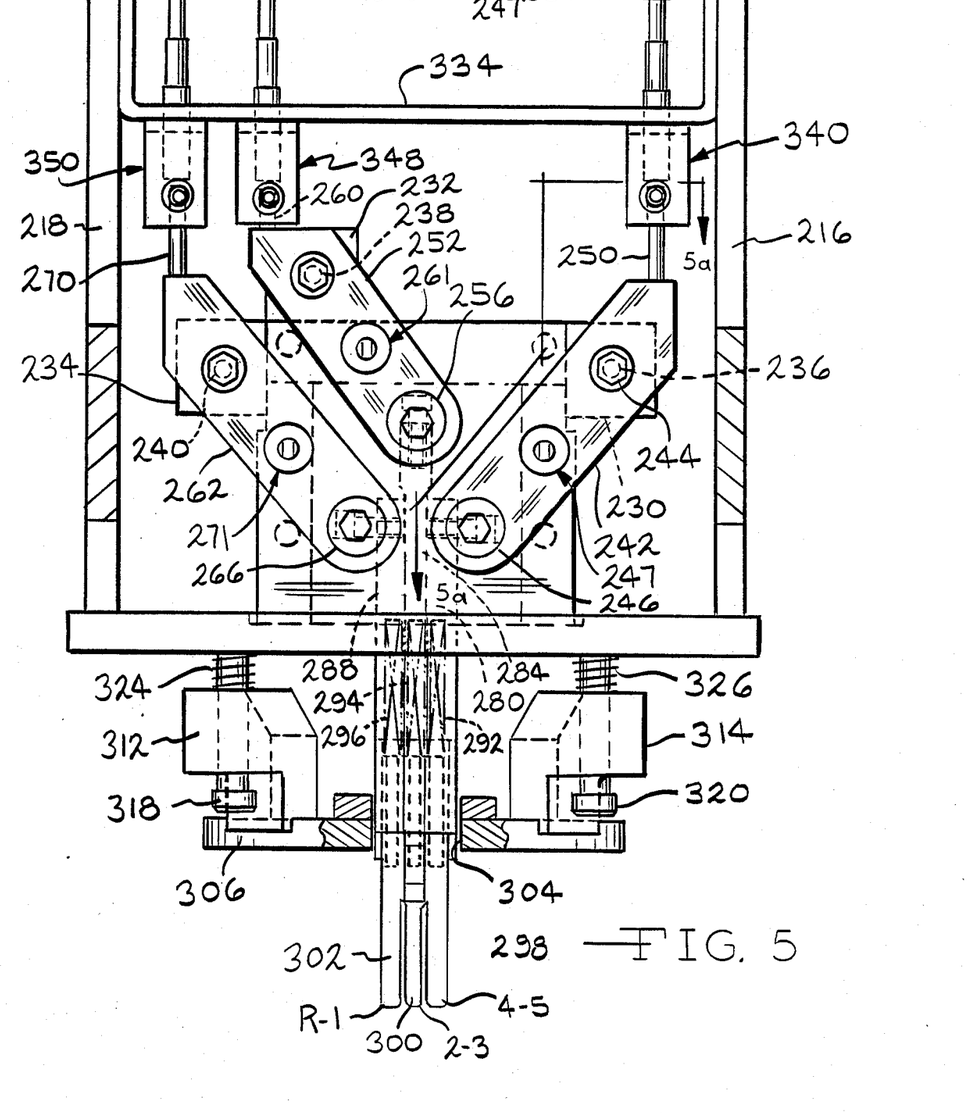
FIG. 5 is a sectional view of the transmission shift test fixture taken along the line 5—5 in FIG. 3, and illustrating the relative positions of the actuating cylinders.
Figure 5A:
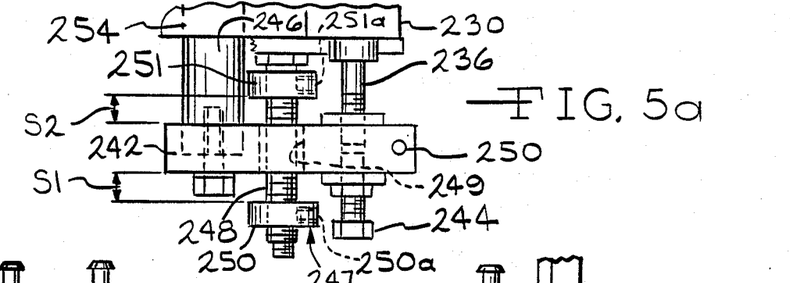
FIG. 5a is a fragmentary top elevational view taken along the line 5a–5a of FIG. 5, and illustrating the manner in which an actuating cylinder is adjustably connected through a linkage arm to a cross rod, and wherein motion limiting means are provided to limit the stroke length of cylinder actuating rod.
Figure 6A:
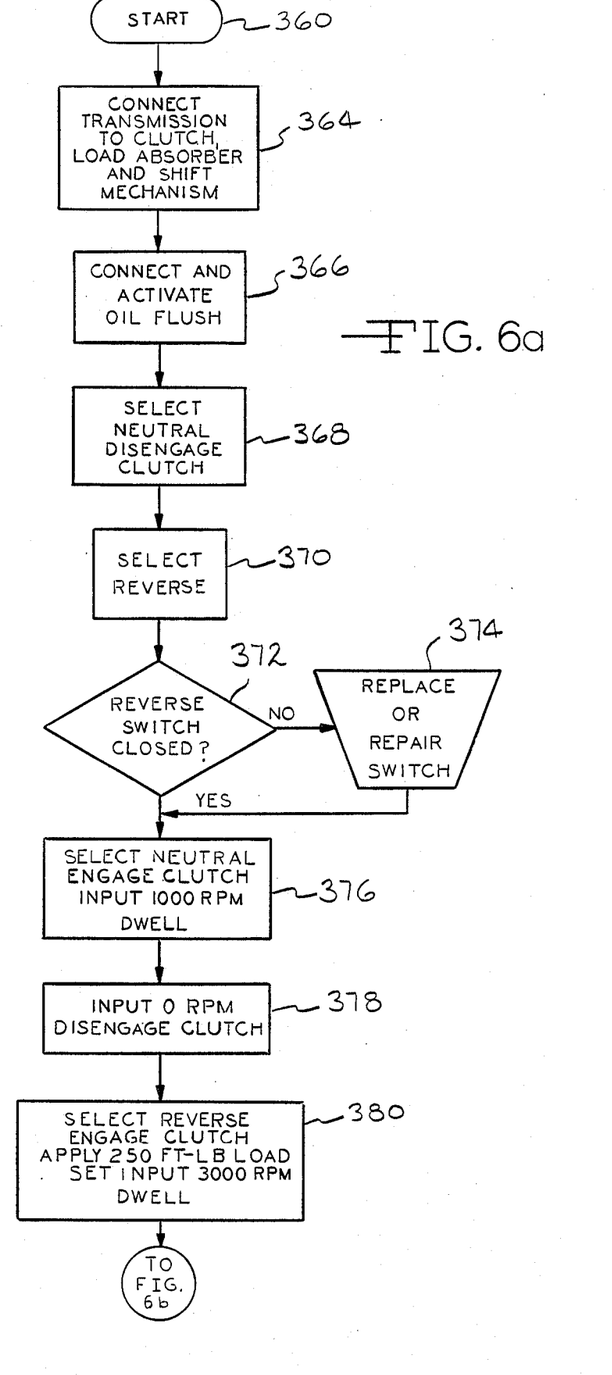
FIGS. 6a, 6b, 6c, 6d, 6e, 6f, and 6g represent a flow chart which illustrates the test procedure of the present invention as used to test a particular five-speed transmission.
Figure 6B:
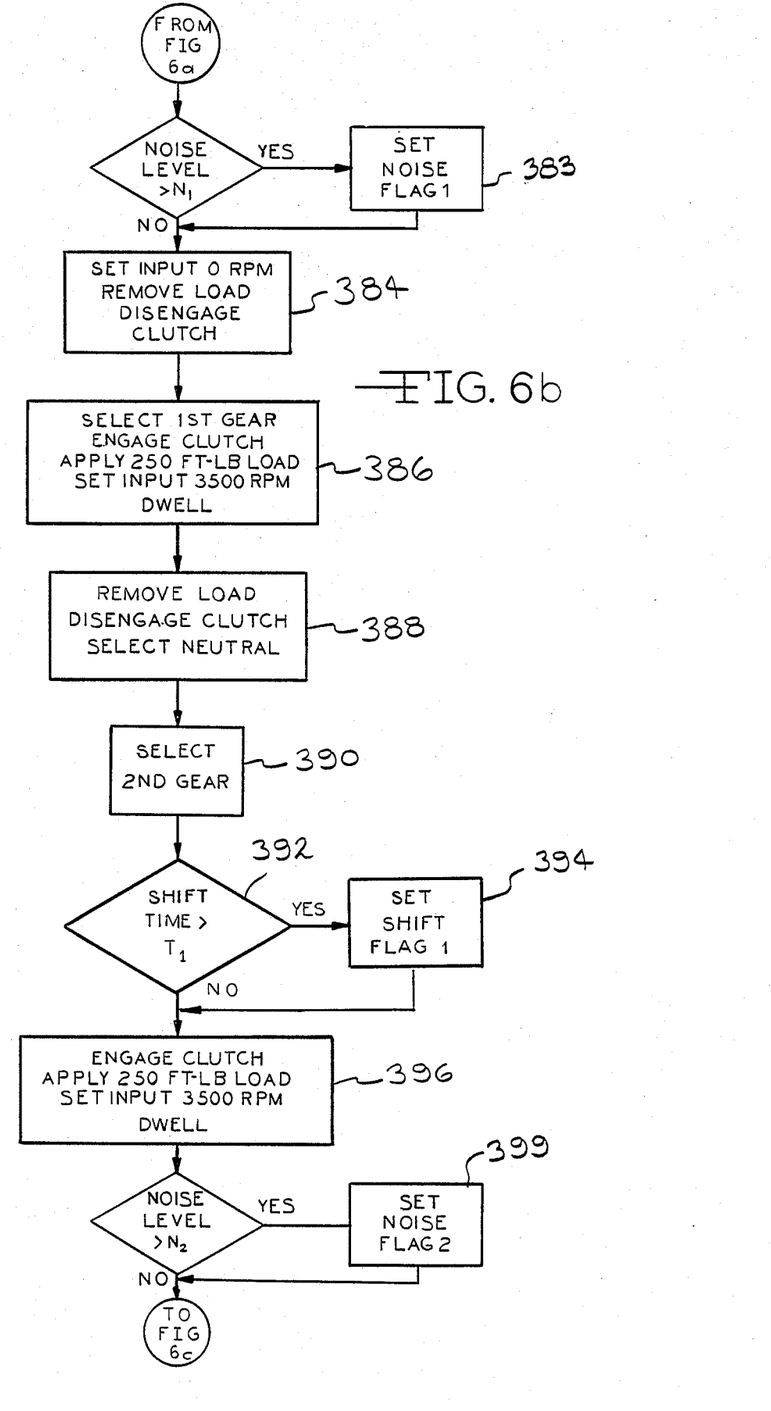
Figure 6C:
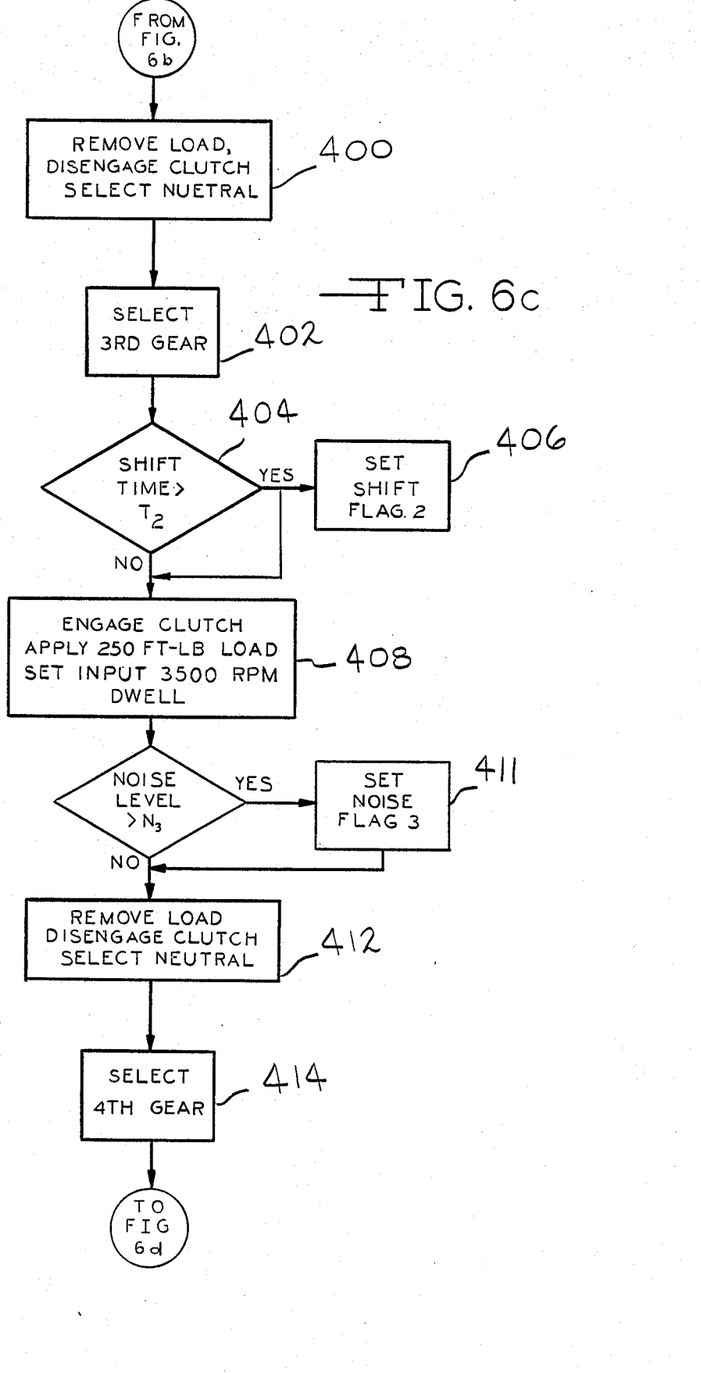
Figure 6D:
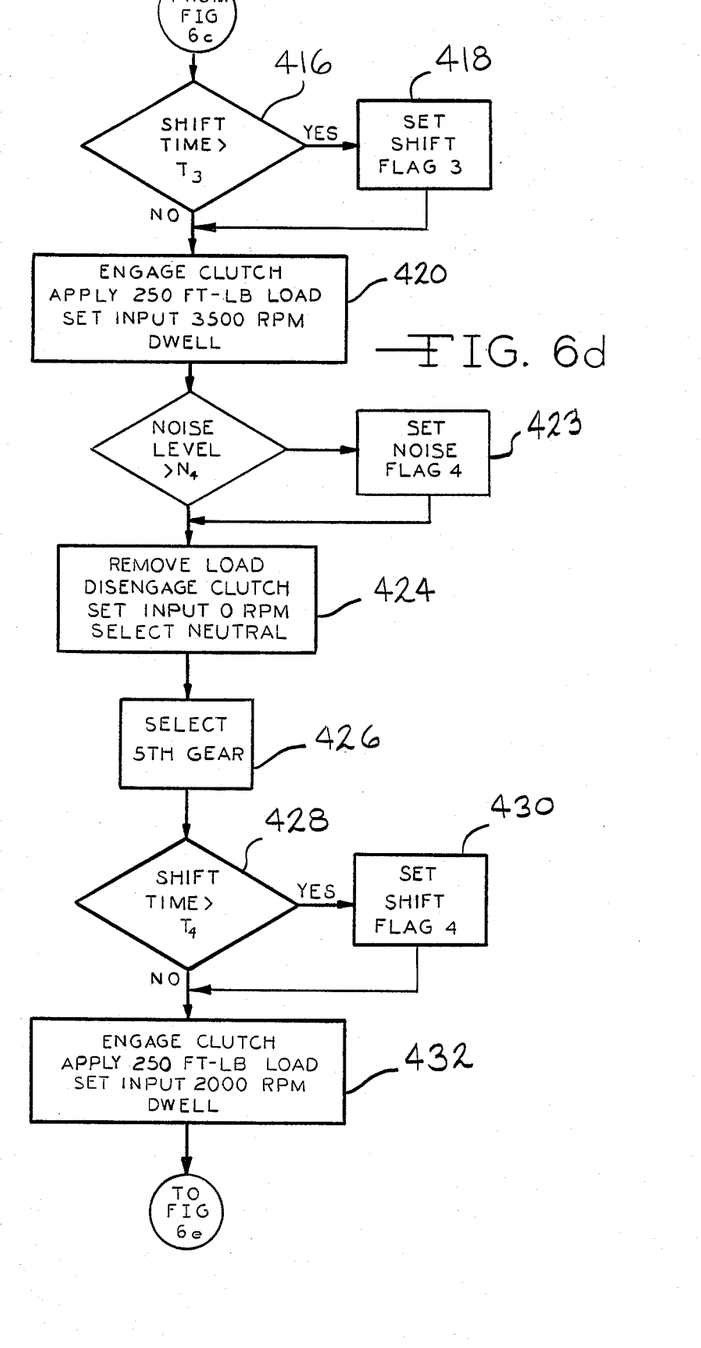
Figure 6E:
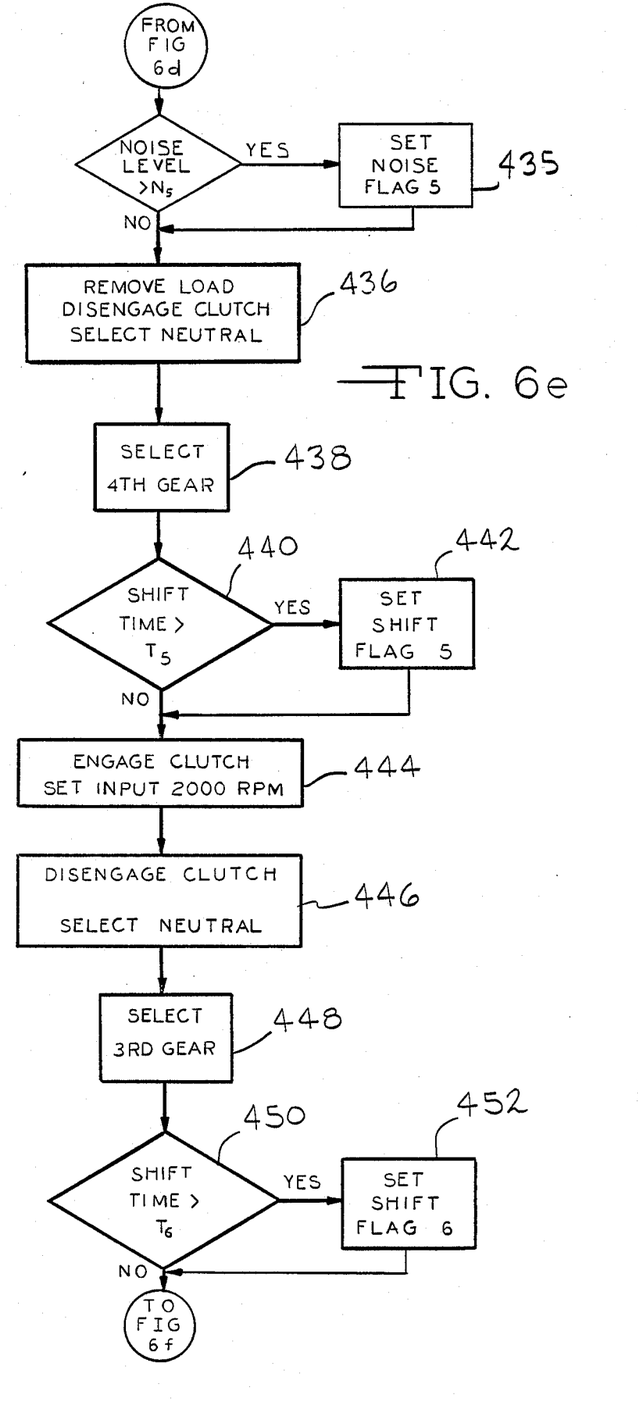
Figure 6F:
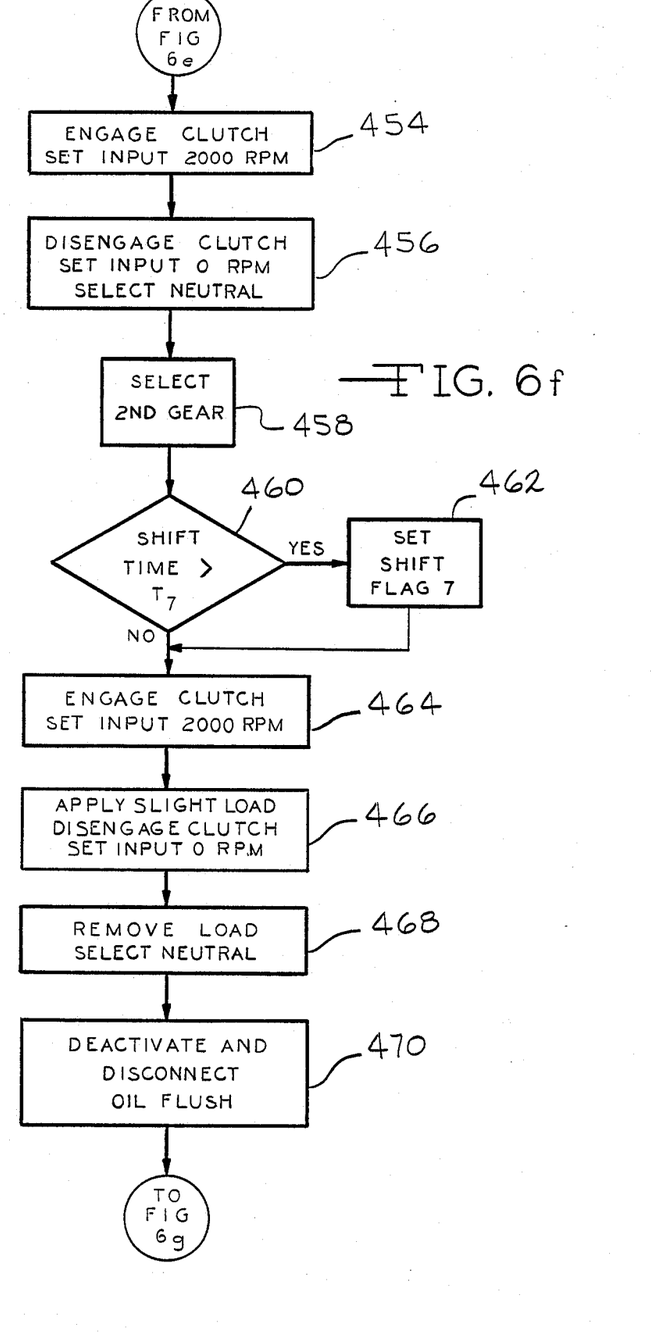
Figure 6G:
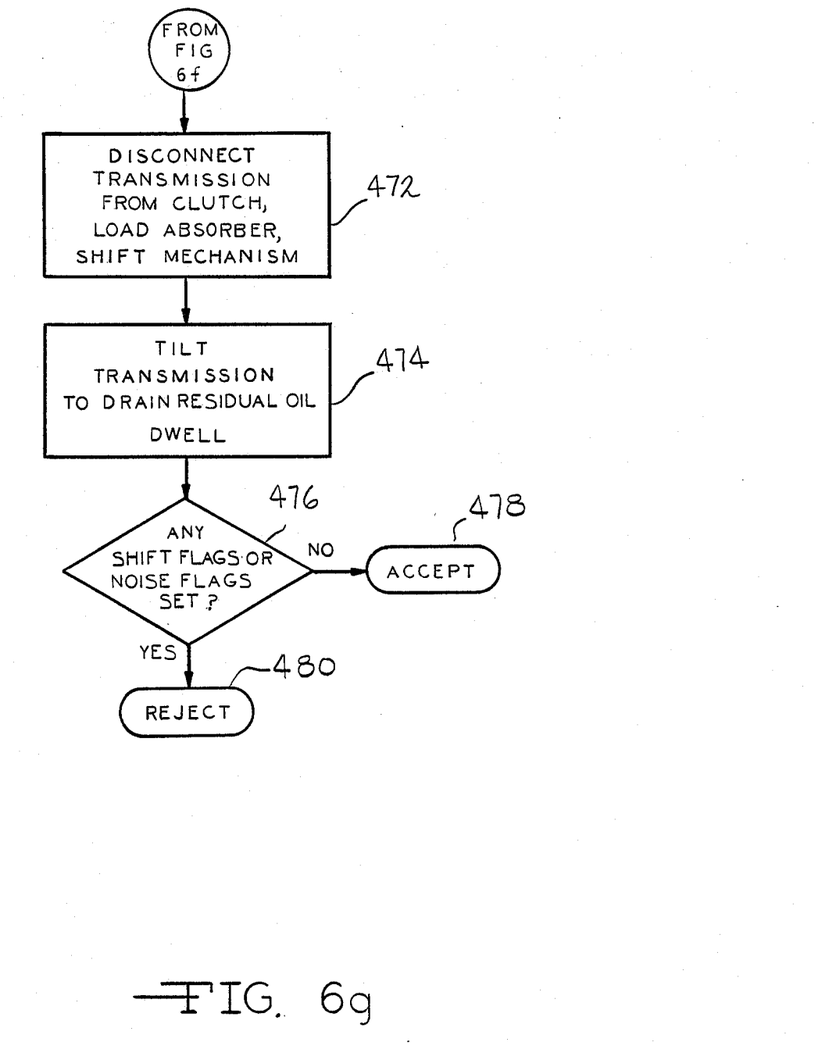

The movable portion 200 includes a pair of spaced apart, vertical support arm members 216 and 218 having their side edges affixed to a sub plate 220 which in turn is affixed to a vertical support plate 222. The support plate 222 is fastened to and interconnects the upper and lower guide blocks 208 and 210. The lower edges of the support arm members 216 and 218 are joined by a horizontally extending cylinder support plate 224. A group of three actuating cylinders 230, 232, and 234 (shown in FIG. 5) are shown mounted in a non-symmetrical triangular pattern and include actuating rods 236, 238, and 240, respectively. As previously mentioned, such cylinders are preferably hydraulically actuated, three position cylinders.

As will be discussed, each actuating rod is adjustably attached to an upper end of a linkage arm which, at its lower end is connected to a cross rod and, at an intermediate position, is coupled to a motion limiting means. Also, the upper end of each actuating arm carries a position indicating pin. In particular, the actuating rod 236 is attached to an upper end of a linkage arm 242 through an adjusting screw mechanism 244. The adjusting screw mechanism is utilized to insure that the center position of the hydraulic cylinder rod corresponds to the neutral position of the associated shift rail. The upper end of the linkage arm 242 also carries an upwardly extending position indicating pin 250. The lower end of the arm 242 is connected to a cross rod 246 which, as will be discussed, is coupled to actuate a selected one of the transmission shift rails.

A motion limiting means 247 limits the stroke lengths S1 and S2 (shown in FIG. 5a) of the actuating rods 236. The motion limiting means 247 includes a threaded shaft member 248 extending through an aperture 249 formed in an intermediate portion of the arm 242, and includes internally threaded adjustable stop members 250 and 251 (having set screws 250a and 251a) on each side of the arm for limiting the stroke length of the associated cylinder rod. The one end of the threaded shaft member 248 is secured to a front support assembly 254. In a like manner, the second actuating shaft 238 is adjustably connected to an upper end of a linkage arm 252 having a lower end connected to a cross rod 256, and provided with a position indicating pin 260 and motion limiting means 261. The actuating shaft portion 240 is adjustably connected to an upper end of a linkage arm 262 having a lower end connected to a cross rod 266, and provided with a position indicating pin 270 and a motion limiting means 271.

The cross rods 246, 256, and 266 are supported by and guided within apertures formed in the front support assembly 254 and a rear support assembly 274 (shown in FIG. 3) secured to the lower support plate 224. The hydraulic cylinders 230, 232, and 234 are supported between the front support assembly 254 and the rear support assembly 274.

Each cross rod carries an upper actuating arm bolted thereto at an intermediate position. The cross rod 246, which in the preferred embodiment of the invention is used to select between the fourth and the fifth gears of the transmission 28 is bolted to an upper actuating arm 280. The cross rod 256, used to select between the second and the third gears of the transmission 28, is bolted to an upper actuating arm 284. The cross rod 266, used to select between the reverse and the first gears of the transmission 28, is bolted to an upper actuating arm 288.

Each upper actuating arm is telescopically joined to a lower actuating arm which is spring-biased to a downward position to allow relative vertical movement between the upper actuating arms and lower actuating arms and avoid damage if the transmission shift rails and the actuating arms are not precisely aligned. For example, each upper actuating arm 280, 284, and 288 defines a pocket containing a spring 292, 294, and 296 and includes slots (such as slots 297 shown in FIG. 3) adapted to telescopically receive the upper ends of lower actuating arms 298, 300, and 302. The lower actuating arms 298, 300, and 302 pass through an opening 304 in a base plate 306 which is adapted to engage the transmission shift tower mounting pad surface 128 of the transmission 28. The plate 306 is spring loaded with respect to the cylinder support plate 224 by means of the bracket members 310, 312, and 314 affixed to plate 306. A plurality of bolts 316, 318, and 320 pass through brackets 310, 312, and into the plate 224. Springs 322, 324, and 326 are interposed between brackets 310, 312, and 314 and the plate 224. If desired, a flexible dust boat (not shown) can be interposed between the cylinder support plate 224 and the transmission engaging base plate 306 to prevent dirt and other contaminants from entering the transmission during the testing operation through the opening 304 in the base plate and an opening 330 in the mounting pad 128 (shown in phantom in FIG. 4).

For the purpose of timing the shifting operations, a U-shaped mounting bracket 334 is mounted between the support arm members 216 and 218 to support the associated timing devices. As previously mentioned, the lower actuating arm 298 operates the transmission shift rail which shifts the transmission between the fourth and fifth gear ratios. For timing the movement of this shift rail member, an array 340 of three proximity sensors 342, 344, and 346 (shown in FIG. 3) is provided adjacent the position indicating pin 250 and mounted by means of a bracket 347. As illustrated, the proximity sensor 342 will provide an output signal when the associated shift rail is in fifth gear, the proximity sensor 344 will identify when this shift rail is in the neutral position, and the sensor 346 will identify when this shift rail is in the fourth gear position. In a like manner, an array 348 (shown in FIG. 5) of three proximity sensors is provided adjacent the position indicating pin 260 to indicate whether the associated shift rail is in second gear, neutral, or third gear. Finally, an array 350 of three proximity sensors are provided adjacent the position indicating pin 270 to indicate whether the associated shift rail is in reverse gear, neutral, or first gear.

Turning now to FIGS. 6a through 6g, there is shown a flow chart illustrating the manner in which the method and apparatus of the present invention can be used to test a particular manual five-speed medium-duty transmission. The method will be described with reference to the test fixture 190 of FIGS. 3, 4, 5, and 5a as used in conjunction with the test stand shown in FIG. 1. The first step, step 360, may be implemented such as by depressing the start button 166. The following step, step 364, involves moving the transmission 28 so that the transmission clutch housing 30 abuts the test clutch housing 26 and the transmission input shaft (not shown) is coupled to the motor 20. Then, the load absorber 46 is moved forward on the carriage 50 and connected to the transmission output shaft. Also the moveable portion 200 of the shift test fixture 190 is lowered into position to move the lower base plate 306 onto the shift lower mounting pad 128 and to engage the lower ends of each one of the actuating arms 298, 300, and 302 with a respective one of the three transmission shift forks.

The next step, step 366, involves moving the oil flush mechanism 60 towards the transmission 28, actuating the hydraulic cylinder 66 to move the apertured member 72 into engagement with the oil drain hole 74, and actuating the hydraulic cylinder 76 to lower the nozzle means 78 into the aperture 84 to fill the transmission with oil. Then, the transmission 28 is initialized in step 368 by operating the hydraulic cylinders 230, 232, and 234 to a neutral position with the respective proximity sensors providing output at the neutral position. Then, in step 370, reverse gear is selected by actuating the cylinder 234. If, as indicated in step 372, the backup or reverse switch is not closed, the switch is replaced or repaired in step 374. When the reverse switch is closed, the hydraulic cylinder 234 is operated in step 376 to select the neutral position of the transmission, the clutch in the housing 26 is engaged, the electric motor 20 is set to provide one thousand rpm, and this condition is maintained for a short period of time. This serves as a preliminary check for misalignment as well as allowing time for a preliminary flush of loose material.

Next, in step 378, the electric motor 20 is set to provide zero rpm, and the clutch in the housing 26 is disengaged. Then, in step 380, reverse gear is selected, the clutch is engaged, the electric motor 20 is set to a predetermined speed such as three thousand rpm, and the load absorber 46 is set to provide a predetermined load such as two hundred fifty pounds. This condition is maintained for a period of time so that the noise produced by the transmission may be measured in step 382. If the noise level at this point is above a predetermined maximum acceptable level $N_1$, a first noise flag is set in step 383. While not shown in the method illustrated in the drawings, it may be desirable to measure the time of a neutral to reverse shift with a constant force provided by the associated actuating cylinders.

The noise level measurement step can be performed manually, since a trained human operator is capable of distinguishing transmission noise from other environmental and random noises while using a conventional sound-pressure-level meter. However, this step may be performed automatically by the use of a spectrum analyzer or a frequency analyzer which identifies noise that is consistent with the transmission's rotational frequency rate. If the environmental noise level is low, the usual output of the sound level meter may be connected to a chart recorder or to a voltage-sensitive relay or a Schmidt-trigger circuit, to retain an indication of excess noise at this stage of testing. If an accurate correlation between measured loudness and perceived loudness is necessary, a loudness meter utilizing critical band filters may be used.

Then, in step 384, a stopped vehicle is simulated, with the electric motor 20 stopped, the load absorber 46 disengaged, and the clutch in the housing 26 disengaged. Next in step 386, the first gear of the transmission 28 is selected. The clutch in the housing 26 is engaged, and the load absorber 46 is set to provide a two hundred fifty foot pound load and the electric motor 20 is set to thirty-five hundred rpm. Then, in rapid sequence, steps 388 and 390 are performed, simulating the actions of a human operator in shifting such a transmission between first and second gear ratios, passing through neutral. In accordance with the present invention, a constant actuating force is provided by the actuating cylinders 234 and 232 in making the first-to-second shift, with the time for stopping the cylinder 234 and starting the cylinder 232 being provided by the respective neutral position proximity sensors. The time required for the selection of the second gear from a neutral position as a constant force is applied through the cylinder 232 is measured by the elapsed time between proximity signals from the respective proximity sensors. As indicated by step 392, if the time is greater than a predetermined maximum acceptable time $T_1$, a flag is set in the step 394. It will be appreciated that the function of steps 392 and 394 may also be performed by a pneumatic or electrical mechanical timing relay, or its solid state equivalent, or a motorized moving-hand timer which has contacts or the equivalent which remain closed while timing.

Then, in step 396, the transmission is put under load in second gear, similar to the procedure of step 380, but with the electric motor 20 set to three thousand five hundred rpm. The noise produced by the transmission 28 under load in second gear is measured at step 398. If the noise level is above a predetermined maximum acceptable level $N_2$, a second noise flag is set in step 399. Then, steps 400 and 402 are quickly performed, simulating the actions of a human operator in shifting from second to third gear by applying a constant force to the shift rail 300 through the cylinder 233. As indicated, the load absorber 46 is disengaged, the clutch in the housing 26 is disengaged, the transmission 28 is placed in neutral, and the cylinder 232 is actuated to cause the lower actuating lever 300 to place the transmission 28 in third gear. The time for the neutral-to-third shift operation is measured in step 404, such as by the time between signals from the respective proximity sensors. As indicated in steps 404 and 406, this time is compared with a predetermined maximum acceptable time $T_2$, and if it is greater than the predetermined time, a memory device such as described in conjunction with step 394 is activated.

Next, in step 408, the transmission is placed under load in third gear, under generally the same conditions as in step 396. Then, in step 410, the noise generated by the transmission under load in third gear is measured, and a third noise flag is set in step 411 if the noise level is above a predetermined maximum $N_2$. Following this, steps 412 and 414 are performed in close proximity, simulating a constant force, driver-controlled shift between third and fourth gears. The time for the neutral-to-fourth shift is measured in steps 416 and 418, such as by measuring the time between signals from the respective proximity sensors 348 and 352 and comparing whether this time is greater than a predetermined maximum time $T_3$. Then, as before, the transmission 28 is placed under a two hundred and fifty pounds load at thirty five hundred rpm in step 420, and the noise it produces under these conditions is measured in step 422. A fourth noise flag is set in step 423 if the noise level is above a predetermined maximum $N_4$. Steps 424 and 426 are then quickly and sequentially performed simulating the actions of a human operator in shifting from fourth to fifth gear when applying a constant force. The time for the neutral-to-fifth shift is compared in step 428 with a predetermined maximum time $T_4$ and a fourth shift flag is set in step 430 if the time $T_4$ is exceeded. Then the transmission 28 is placed under load in fourth gear at two thousand rpm in step 432, and the noise produced in this condition is measured in step 434. A fifth noise flag is set in step 435 if the noise level exceeds a predetermined maximum $N_4$.

Then, simulating a downshift from fifth gear to fourth gear, steps 436 and 438 are performed in quick succession and the time required for the neutral-to-fourth shift is measured by the time between signals from the respective proximity sensors. In step 440, this time is compared with a predetermined maximum time $T_5$ and, if time $T_5$ is exceeded, a fifth shift flag is set in the step 442.

Then in step 444, the clutch is engaged and the transmission 28 is brought up to an input speed of two thousand rpm in preparation for a simulated downshift. When steps 446 and 448 are quickly and sequentially performed, the transmission 28 is downshifted from fourth gear to third gear. Then, in step 450, the time required for the neutral-to-third shift is measured such as by the difference in time of signals from the respective proximity sensors, and if the required shift time is greater than a predetermined maximum $T_6$, a sixth shift flag is set in step 452. And, as before, in step 454, the clutch is engaged and the transmission 28 is brought to two thousand rpm in third gear in preparation for a three-two downshift which occurs in steps 456 and 458. In steps 460 and 462, the time required for a neutral-to-second shift is measured and, if this time is greater than a predetermined maximum acceptable time $T_7$, a seventh shift flag is set in step 462.

Then, as before, in step 464, the transmission 28 is brought to two thousand rpm in second gear. Next, in step 466, the transmission 28 is sequentially placed under a shift load to enable the motor 20 to be brought to a stop and then, in step 468, the load absorber 46 is deactivated and the transmission 28 is returned to neutral. Then, the procedures shown as steps 364 and 366 are reversed in steps 470 and 472. The transmission 28 is tilted such as by deactuating the hydraulic cylinder 44 in step 474 to drain any residual out. A collection pan with suitable filtering may be provided and this oil returned for subsequent circulation through the lines 86 and 88. Then, in the preferred embodiment of the invention, step 476 determines whether any shift or noise flags have been set. If not, as indicated by step 478, the transmission 28 is acceptable and the indicator light 168 may be illuminated. If any of the shift or noise flags have been set, the transmission 28 is indicated as being unacceptable in step 480 such as by the illumination of the light 170.

It should be noted that many variations on the above shifting sequence, along with the particular shift times measured, are possible. For example, while all of the above shift times are initiated from a neutral position, in some instances it may be desirable to measure the time to complete a gear-to-gear upshift (such as a first-second shift), or the time to complete a gear-to-gear downshift, by monitoring signals from the respective proximity sensors. Also, the order of shifting may be varied from the above sequence.

Thus, the present invention provides a method of verifying that all significant characteristics of a manual transmission are acceptable in a production-line environment and avoids the labor costs of removing a undersirable transmission from a vehicle.

The present invention has been illustrated and described in its preferred embodiment. However, it will be appreciated that numerous modifications and variations of the invention described above will be obvious to one skilled in the art, and may be easily made without departing from the spirit or scope of the claimed invention.

We claim:

1. A method of testing a manual transmission, comprising the steps of:
    (a) inserting an actuating arm through a shift tower opening in a manual transmission to operatively engage a shifting member therein;
    (b) applying a predetermined force to the actuating arm to move the shifting member from a first predetermined position to a second predetermined position to shift the shifting member;
    (c) measuring the time required for said predetermined force to move the shifting member from said first predetermined position to said second predetermined position;
    (d) comparing said required time with a predetermined reference time to determine a shifting quality of said transmission; and
    (e) subsequent to step (b), removing the actuating arm from the transmission.

2. The method according to claim 1 wherein step (b) includes the step of applying a substantially constant force to the shifting member as the shifting member is moved from said first predetermined position to said second predetermined position.

3. A method of testing a manual transmission comprising the steps of:
    (a) inserting actuating arm means through a shift tower opening in a manual transmission to operatively engage first and second shifting members;
    (b) applying a first predetermined force to the actuating arm means to move the first shifting member from a first predetermined position to a second predetermined position to shift the first shifting member;
    (c) measuring the time required for said first predetermined force to move the first shifting member from said first predetermined position to said second predetermined position;
    (d) applying a second predetermined force to the actuating arm means to move the second shifting member from a third predetermined position to a fourth predetermined position to shift the second shifting member;
    (e) measuring the time required for said second predetermined force to move the second shifting member from said third predetermined position to said fourth predetermined position;
    (f) adding the time measured in step (c) to the time measured in step (e) to obtain a combined total time;
    (g) comparing said combined total time with a predetermined reference time to determine a shifting quality of said transmission; and
    (h) subsequent to steps (b) and (d), removing the actuating arm means from the transmission.

4. The method according to claim 3 wherein said first and second predetermined forces are equal to one another and are substantially constant.

5. An apparatus for testing a manual transmission, comprising:
    an actuating member extending through a shift tower opening in the transmission and operatively engaging a shifting member of the transmission;
    means for inserting and removing said actuating member from the transmission;
    means for applying a predetermined force to said actuating member to move the shifting member from a first predetermined position to a second predetermined position;
    sensing means responsive to said first and second predetermined positions of the shifting member;
    timing means responsive to said sensing means for measuring the time required for said actuating member to move the shifting member between said first and second predetermined positions; and
    comparison means for comparing said required time with a predetermined reference time to determine a shifting quality of the transmission.

6. The apparatus according to claim 5 wherein said means for applying said predetermined force applies a relatively constant force.

7. The apparatus according to claim 5 wherein said actuating member is one of a plurality of actuating members, said plurality of actuating members equal in number to a plurality of shifting members in the transmission, each of said actuating members operatively engageable with a separate shifting member.

8. A method of testing a manual transmission having a plurality of shift rail members and defining a mounting pad area thereon, comprising the steps of:
    (a) providing a test fixture having a mounting portion for engaging said mounting pad area, and having a plurality of independent actuating members equal in number to said plurality of shift rail members, each of said actuating members adapted to operatively engage a separate one of said shift rail members;
    (b) mounting said test fixture to said mounting pad area, with each of said actuating members engaging a respective one of said shift rail members;
    (c) operating said actuating members in a predetermined sequence to actuate said shift rail members in a predetermined sequence; and
    (d) simultaneously with step (c), sensing predetermined operating characteristics of the transmission to determine an operating quality of the transmission.

9. A method of testing a manual transmission according to claim 8 wherein said method includes the steps of selectively connecting an input of said transmission to a motor means and connecting an output of said transmission to an energy absorbing load means.

10. A method of testing a manual transmission according to claim 9 wherein step (c) includes the steps of operating said motor means at a plurality of predetermined rotational speeds; operating a clutch means to engage said motor means to said input and to disengage said motor means from said input in a predetermined sequence; operating said energy absorbing load means in a predetermined sequence to apply a load to said transmission while said transmission is in one of a plurality of gear ratios and said clutch means is engaging said input to said motor.

11. A method of testing a manual transmission according to claim 10 including the step of measuring and recording the noise produced by the transmission while said motor means is engaged to said input and said energy absorbing load means is operated as an indicia of the acceptability of said transmission.

12. A method of testing a manual transmission according to claim 8, wherein step (d) includes the step of measuring the time required for said actuating members to actuate said shift rail members when shifting said transmission between adjacent gear ratios as an indication of the acceptability of the transmission.

13. A method of testing a manual transmission according to claim 12 including the step of storing a predetermined reference time representing an acceptable shift as an indication of the acceptability of said transmission.

14. A method of testing a manual transmission according to claim 8 wherein the step of providing a test fixture includes the step of automatically positioning the test fixture on said transmission mounting pad area.

15. A test fixture for testing a manual transmission, comprising;
- support means for supporting a plurality of independent actuating members, said plurality of actuating members being equal in number to a plurality of shift rail members of the transmission;
- said support means including a mounting portion for engagement with a mounting pad of the transmission;
- each said actuating members operatively engaging a respective one of the shift rail members; and
- means for independently actuating each of said actuating members to shift a respective one of the shift rail members.

16. A test fixture according to claim 15, wherein at least one of said actuating members includes a fluid actuated cylinder means and an actuating arm for coupling said cylinder means to a respective one of the shift rail members.

17. A test fixture according to claim 16 includes adjustable motion limiting means for limiting the range of movement of said actuating arm.

* * * * *